Dec. 29, 1925.
S. E. DUVECK
1,567,123
DISPLAY DEVICE
Original Filed April 8, 1922   5 Sheets-Sheet 1
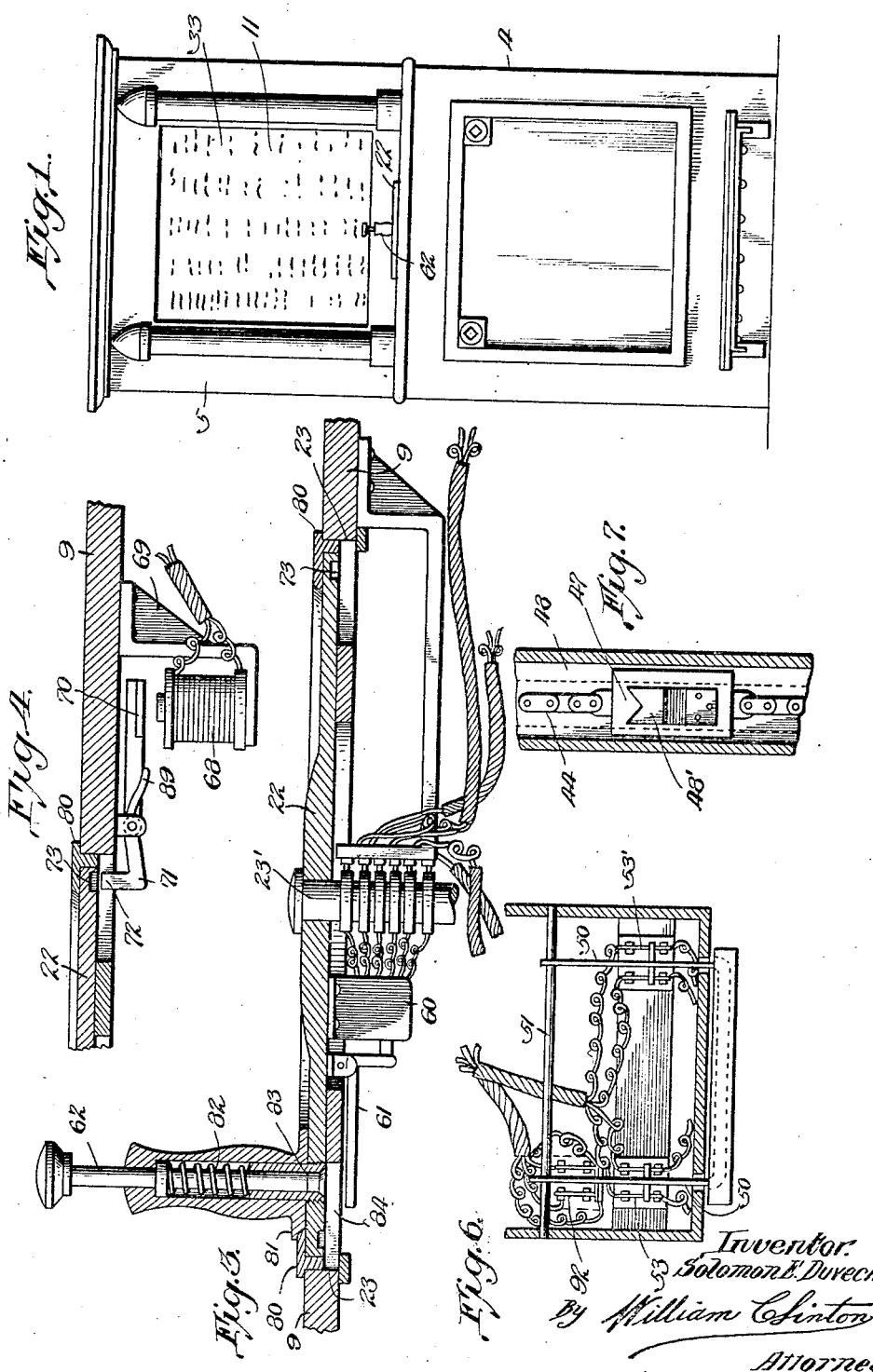

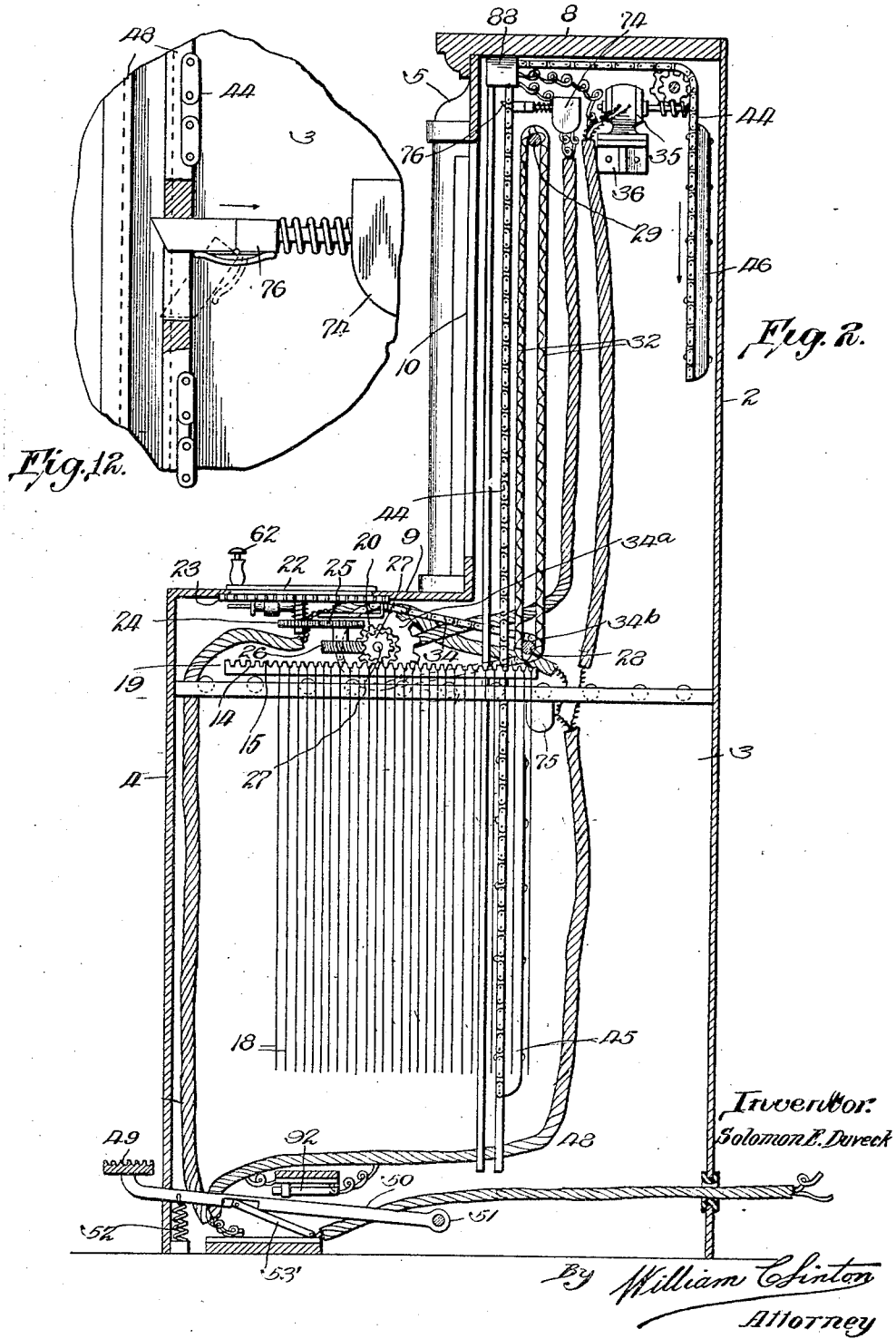

Dec. 29, 1925.
S. E. DUVECK
1,567,123
DISPLAY DEVICE
Original Filed April 8, 1922    5 Sheets-Sheet 3
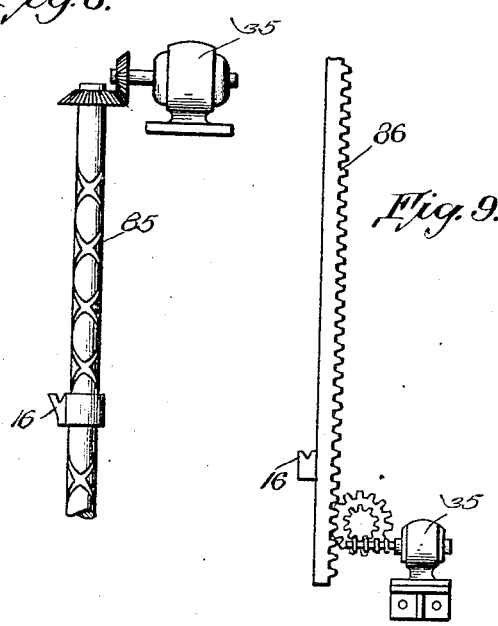
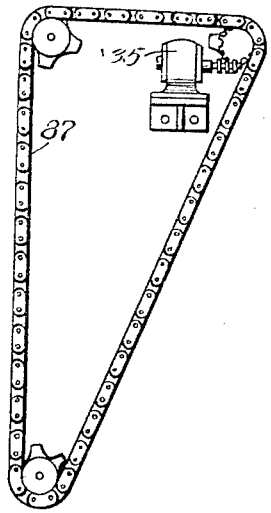
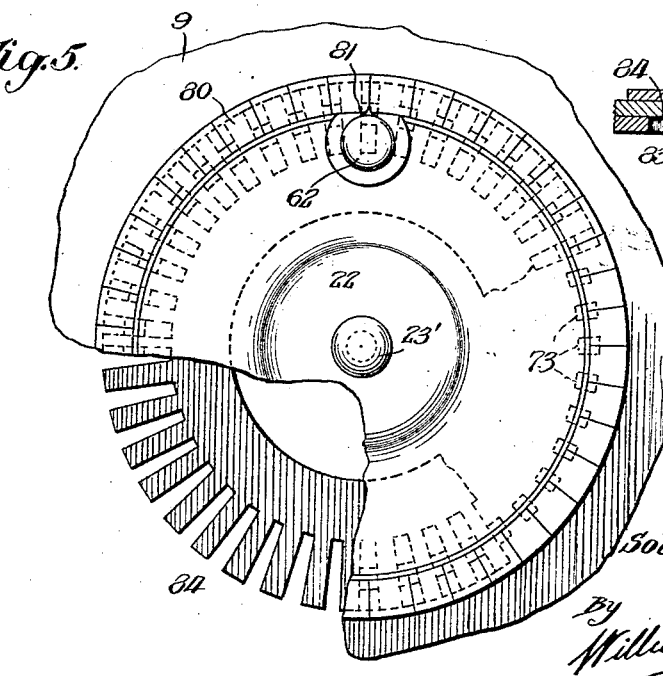
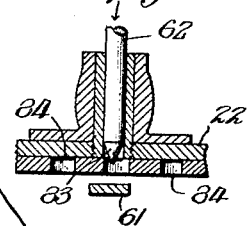

Dec. 29, 1925.  
S. E. DUVECK  
DISPLAY DEVICE  
1,567,123

Original Filed April 8, 1922    5 Sheets-Sheet 4

Inventor.  
Solomon E. Duveck  
By William Clinton  
Attorney

Dec. 29, 1925.
S. E. DUVECK
1,567,123
DISPLAY DEVICE
Original Filed April 8, 1922    5 Sheets-Sheet 5
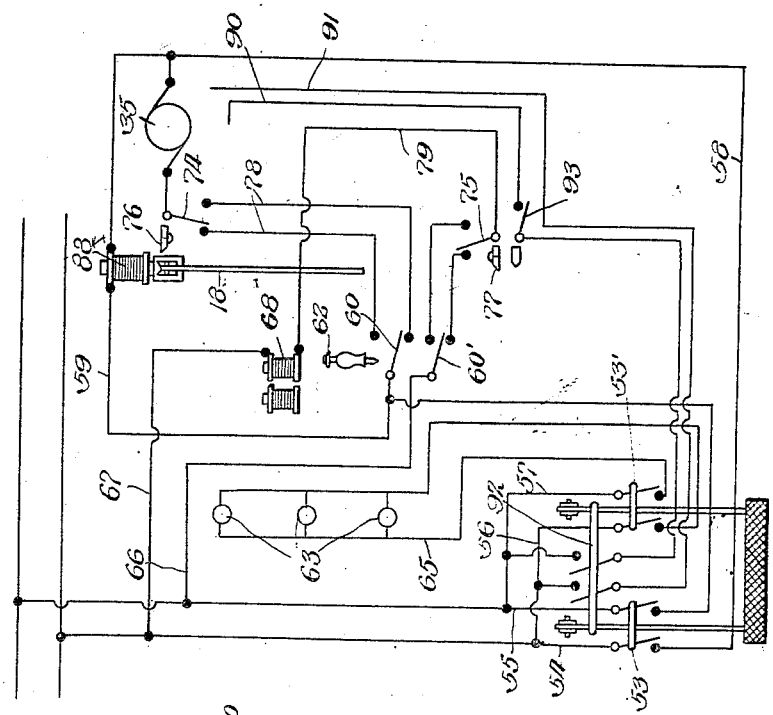
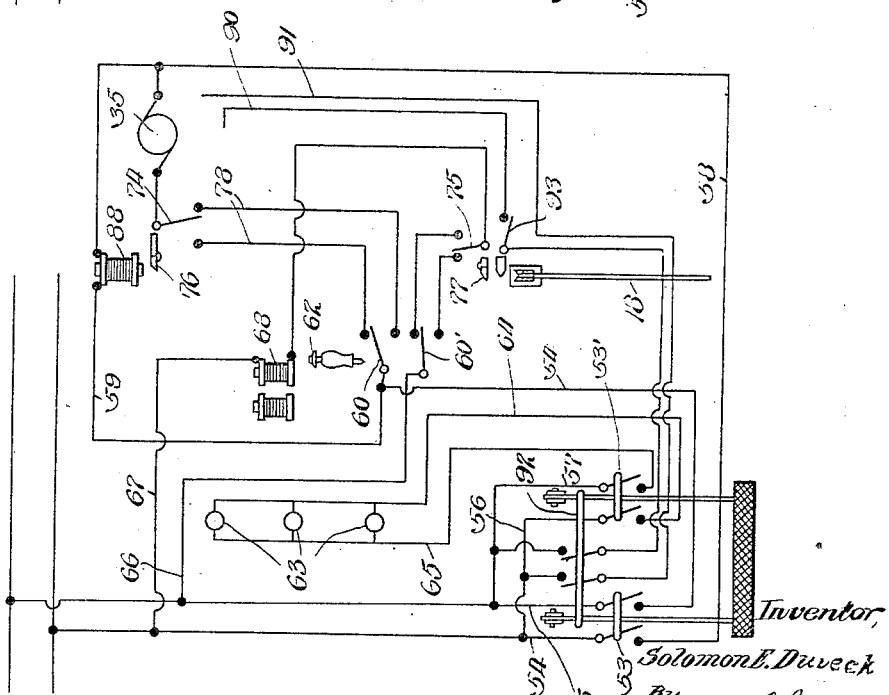
Inventor,
Solomon E. Duveck
By William Clinton
Attorney Patented Dec. 29, 1925.

1,567,123

UNITED STATES PATENT OFFICE.

SOLOMON ELIAS DUVECK, OF MONTREAL, QUEBEC, CANADA, ASSIGNOR TO PUBLIC SERVICE DIRECTORIES, INC., OF NEW YORK, N. Y.

DISPLAY DEVICE.

Application filed April 8, 1922, Serial No. 550,726. Renewed November 9, 1925.

*To all whom it may concern:*

Be it known that I, SOLOMON ELIAS DUVECK, a subject of the King of Great Britain, residing at Montreal, Province of Quebec, Canada, have invented certain new and useful Improvements in Display Devices; and I do hereby declare that the following is a full, clear, and exact description of the invention, such as will enable others skilled in the art to which it appertains to make and use the same.

The present invention relates to display devices and more particularly to an apparatus of the nature of a business directory.

The primary object of the invention is the provision of an electrical mechanism for actuating the various parts of the machine.

Another object of the invention is to provide means for selecting and bringing into view any one of a series of cards and for automatically returning such cards to their initial positions after they have been exposed to view and read.

Another object of the invention is to provide novel means whereby any one of a plurality of cards may be selected and, upon the closing of suitable electric circuits, brought into the view of the operator and automatically returned to its initial position when said circuits are broken.

A further object of the invention is to provide means for supporting the cards to be displayed so that the mechanism for raising the same to view will remove the card from its support, present it to the view of the reader, and afterwards automatically return the card to its support without interfering or affecting in any way the remaining cards.

A still further object of the invention is the provision of an apparatus such as above referred to, which will be comparatively simple and inexpensive to manufacture, reliable and efficient in use, and readily operated.

With the above and other objects in view, the present invention resides in the novel features of construction, formations, combinations and arrangements of parts to be hereinafter more fully described, claimed, and illustrated in the accompanying drawings, forming a part of the present application, and in which:

Figure 1 is a front elevation of the invention;

Figure 2 is a vertical longitudinal sectional view thereof;

Figure 3 is an enlarged detail sectional view of the plunger and controlling switch;

Figure 4 is a similar view of the locking mechanism for the rotatable plate;

Figure 5 is a plan view of the plate with parts broken away;

Figure 6 is a sectional view of the lower portion of the casing showing the foot rest;

Figure 7 is a detail view showing one of the actuating chains for raising the display cards;

Figure 8 is a modified form similar to Figure 7 showing an actuating screw for operating the same;

Figure 9 is a similar view showing the rack for raising the cards;

Figure 10 is a side view of the chain mechanism for raising the cards;

Figure 11 is a detail sectional view showing the lower end of the plunger which operates the switch;

Figure 12 is a detail view of the upper trip member;

Figure 16 is a diagrammatic view showing the electric wiring with the circuits open; and, Figure 17 is a similar view showing the circuits closed.

Figure 13:
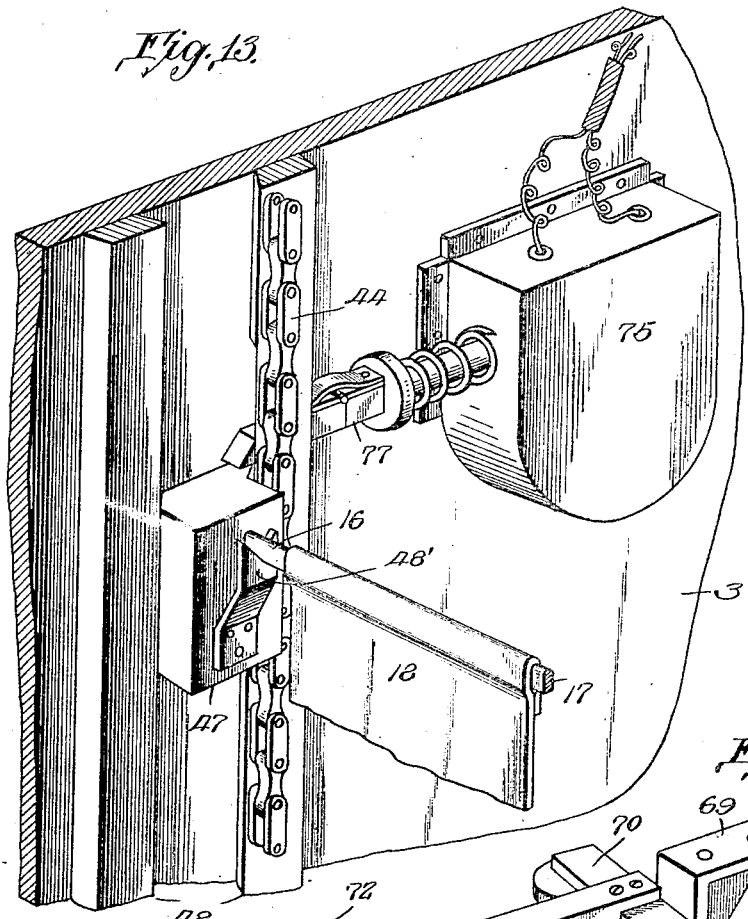
Figure 13 is an enlarged perspective view showing the middle trip member.
Figure 14:
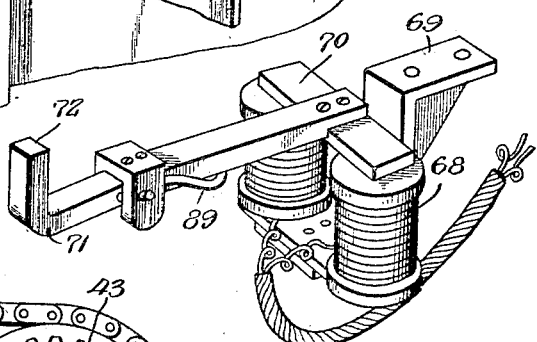
Figure 14 is a perspective view of the plate locking mechanism.

Referring now to the accompanying drawings by corresponding characters of reference throughout the several views, the numeral 1 designates in general my improved display device which comprises a casing 2, including opposite side walls 3, spaced front walls 4 and 5, and a rear wall 6, a top 8 and an intermediate ledge or table portion 9.

The upper front wall 5 is provided with a suitable display opening 10, which may be closed by a suitable glass panel 11.

A pair of guides 12 are mounted adjacent the opposite side walls 3 below the table 9 and are disposed parallel thereto. These guides are provided at their upper edges with rollers 13 which support the movable racks 14 which are provided in their upper edges with notches 15 which engage the extended ends 16 of reinforcing members 17 which support the upper edges of the display cards 18.

The racks 14 are likewise provided with teeth 19 which mesh with the pinions 20 carried by a transversely extending shaft 21. Obviously upon the rotation of this shaft 21, the racks will be oscillated forwardly and rearwardly of the casing 2 to a desired position as will be hereinafter explained.

A rotatable disk 22 is positioned in an opening 23 formed in the table 9, and supports a central shaft 23′ which has a gear 24 keyed to its lower end. This gear 24 meshes with a similar gear 25 which carries a spiral gear 26 at its lower end. This spiral gear 26 meshes with a spiral gear 27 attached to the central portion of the shaft 21, so obviously as the disk 22 is revolved to its various positions, the racks 14 will be simultaneously oscillated longitudinally of the housing 2 carrying the display cards 18 therewith.

A pair of rollers 28 and 29 extend transversely of the housing at the opposite ends of the display opening 10, and over these rollers passes an endless webbing 32 on which may be printed in several languages an index 33. The rollers 28 and 29 which support the said webbing 32 may be rotated so that the various sides thereof are exposed by means of a chain 34 driven from the shaft 21 previously referred to. The sprockets 34ª and 34ᵇ over which the chain 34 passes are of such size as to cause a very rapid movement of the webbing upon a slight movement of the disk 22.

Figure 15:
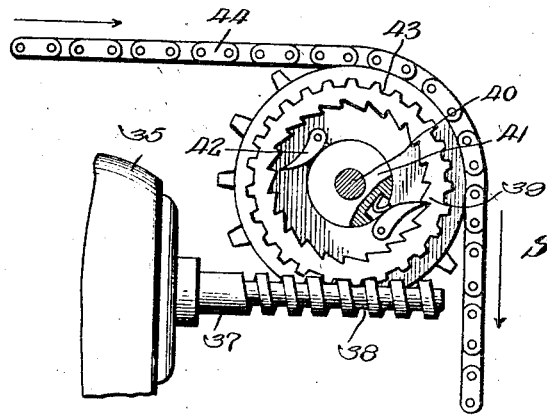
Figure 15 is a view illustrating the means for driving the chain for raising and lowering the display cards.

A motor 35 is mounted on a suitable bracket 36 within the upper end of the housing, and the drive shaft 37 thereof is cut to form a drive worm 38 which meshes with a worm wheel 39 mounted on a shaft 40 as shown in Fig. 15. A suitable clutch member 41 including a pawl and ratchet mechanism 42 connects the worm wheel 39 with the shaft 40 in such manner that upon the rotation of the shaft 37 in one direction the shaft 40 will be rotated, rotating the sprockets 43 and moving the chains 44 in the direction of the arrow shown in Figures 2 and 15.

These chains 44 are provided with counter-weights 45 and 46 at the opposite ends thereof so that when the motor is rotated, it will raise the weights 45 which are heavier than the weights 46, but when the motor ceases operation through the clutch mechanism 41, the weights 45 will be allowed to pull the chains downwardly to their initial positions.

The chains 44 are provided with suitable blocks 47 which slide in the guides 48 secured to the opposite sides 3 of the housing 2.

The blocks 47 have clips 48′ attached thereto which, upon their upward movement, engage the extended ends 16 of the reinforcing strip 17, thus raising the proper card 18 which is positioned in the path thereof so that it will extend upwardly and can be observed through the opening 10.

A foot rest 49 is mounted at the forward side of the machine adjacent its lower end and has connected thereto a lever 50 which is pivoted as at 51 within the housing.

This foot rest 49 is retained in raised position by the springs 52 and it is necessary to press upon the same with the foot in order to lower it. The opposite sides of the lever 50 are adapted to control and close the switches 53 and 53′ upon their depression, and control the current which leads into the same through the conductors 54, 55, 56 and 57 from any suitable source not shown. (See Figures 16 and 17.)

Current from the conductor 54 may pass upon the closing of the switch 53 through the conductor 58 to the motor 35, while current from the conductor 55 likewise passes to the said motor 35 through the conductor 59 being controlled by the three-way switch 60 which is actuated through the bell crank lever 61 by means of the plunger 62 carried by the plate or disk 22. The conductor 56 is connected to a series of lamps 63 by a conductor 64, while a conductor 65 leads from the lamps back to the conductor 57. The circuit to the lamps is closed or opened by the switch 53′. The lamps 63 are preferably positioned within suitable slotted pillows on the opposite sides of the opening 10 of the front wall 55, and obviously when these lamps are lighted, the display cards can be readily observed.

A conductor 66 leads from the conductor 55 to the switch 60′ positioned adjacent the switch 60. A conductor 67 leads from the conductor 54 to the magnet 68 and when the switch is in one position, current will energize the locking magnet 68 carried by a bracket 69 causing the inner end 70 of the latch member 71 to be drawn downwardly, thus forcing the locking terminal 72 thereof upwardly into engagement with one of a plurality of notches 73 formed in the disk 22, thus locking the disk against any undesired rotation.

An upper switch is shown at 74, while a lower switch is shown at 75. These switches are actuated by the trip members 76 and 77 respectively, which are disposed in the path of the blocks 47 above referred to and serve to control the current to the motor through the conductor 78, while the current to the locking device is controlled through the conductor 79 by the switch 75 above referred to.

In operation a person first presses down the foot rest 49 by standing on the same or exerting foot pressure thereon, which closes the switches 53 and 53'. This carries the current first to the lamps 63 and illuminates the same, making it possible for the operator to clearly observe the index 33 through the opening 10.

On this index the numbers referring to the display cards desired by the operator may be readily ascertained, and the operator then moves the plunger 62 to the desired number marked on the ring 80 which surrounds the disk 22, and when the pointer 81 has reached this mark, the plunger 62 is depressed against the tension of the spring 82. It will be noted that the lower end of the plunger is tapered as shown at 83 so that it will at all times pass through one of the several notches 84. The depression of the plunger 62 actuates the bell crank lever 61 which operates the switches 60 and 60'. These switches 60 and 60' upon being closed carry the current from the switches to the motor which sets the motor in operation, and likewise energizes the magnet 68 so that the disk 22 will be held against any undesired further movement.

The operation of the motor 35 raises the selected display card from the racks 14 either by means of the chains shown in Figure 2, the screw element 85 shown in Figure 8, the rack 86 shown in Figure 9, or the endless chain 87 shown in Figure 10 until the latter is positioned before the display opening 10. When the rack reaches its uppermost position, it strikes the upper trip member 76, thus throwing the switch 74 and breaking the circuit to the motor 35, causing the latter to prevent any further upward movement of the said display card.

After the operator has obtained the desired information, he steps from the foot rest 49 which breaks all of the circuits except that including the locking device 72. As the circuit to the magnet 88 is broken, this magnet which holds the display card in raised position, after the motor ceases operation, is de-energized, permitting the weights 45 which are heavier than the weights 46 to pull the chains 44 downwardly, thus returning the display cards to their initial positions.

During the downward movement of the display cards, the disk 22 remains locked, as the magnets 68 are still energized, but as the blocks 47 strike the trip member 77, the switch 75 will be thrown open, thus breaking the current to the magnet through the conductor 79. The breaking of this current de-energizes the magnet 68 and allows the latch 71 to be forced by the spring 89 to inoperative position.

Referring particularly to the operation of the mechanism shown in Figures 8, 9 and 10, the screw element shown in Figure 8 is operated by driving the latter in the same direction at all times, merely stopping the motor when it is desired to retain the card in its desired position, but in Figures 9 and 10, it is necessary to reverse the motor in order that the rack or endless chain can be raised and lowered. To this end a reverse circuit including conductors 90 and 91 are connected to reversing terminals (not shown) of the motor. These conductors lead to a switch 92 actuated by the foot rest 49 so that the circuit to the motors will be opened or closed as desired.

A switch 93 is also employed in the path of the cards and the operation of this device is as follows:

The card upon being raised is designed to close the switch 93 while the switch 92 is closed when pressure is relieved from the foot board 49.

As the desired card is being raised, the operator stands upon the foot rest 49 which opens the switch 92. As the card goes up, the switch 93 is closed, but the switch 92 being opened will not in any way affect the reversing of the motor, and the motor is allowed to operate in the usual manner.

When, however, the operator is through using the apparatus and steps from the foot rest 49, the switch 92 will be closed and as the switch 93 is likewise closed, the motor will be thrown into reverse motion, and obviously the card which has previously been raised will be lowered to its initial position.

As the card strikes the trip member of the switch 93 upon reaching its lowered position, this switch 93 will be thrown open and the reverse circuit to the motor broken, thus completing the operation of the machine.

From the foregoing description, taken in connection with the accompanying drawings, it will be manifest that a display device in the form of a directory or the like is provided which will fulfill all of the necessary requirements of such a device, and it should be understood in this connection, that various minor changes in the specific details of construction, can be resorted to within the scope of the appended claims, without departing from the spirit or sacrificing any of the advantages of the invention.

Having thus fully described my invention, what I claim as new and desire to protect by Letters Patent is:—

1. In a machine of the character described, the combination of a plurality of display cards, means for supporting the same, means for selecting certain of said cards, electrical means for raising and lowering said cards, means for locking the selecting means, means engageable by the cards when in one position for causing the electrical means to cease operation, and means actuated by the cards upon movement to another position, to throw the selecting mechanism locking means out of operation.

2. A machine of the type described, comprising a housing, a plurality of display cards located therein, means for engaging said cards to raise and lower the same, a selecting means for moving the cards into engagement with the raising and lowering means, electrical means for operating said raising and lowering means, electrical means for causing the electrical actuating means for the raising and lowering means to cease motion, electrical means for retaining the display cards in raised position, means for breaking the circuit to the last mentioned means, and permitting the cards to fall to initial position by gravity, locking means for the selecting mechanism, and a trip mechanism engageable by the cards upon their downward movement for releasing said locking mechanism, substantially as and for the purposes set forth.

3. A machine of the type described, comprising a housing, a plurality of display cards located therein, means for engaging said cards to raise and lower the same, a selecting means for moving the cards into engagement with the raising and lowering means, electrical means for operating said raising and lowering means, electrical means for causing the electrical means for the raising and lowering means to cease motion, electrical means for retaining the display cards in raised position, means for breaking the circuit to the last mentioned means, electrical means for driving the cards to lowered position, locking means for the selecting mechanism, and a trip mechanism engageable by the cards upon their downward movement for releasing said locking mechanism, substantially as and for the purposes set forth.

4. A machine of the type described, comprising a housing, a plurality of display cards located therein, means for engaging said cards to raise and lower the same, a selecting means for moving the cards into engagement with the raising and lowering means, electrical means for operating said raising and lowering means, electrical means for causing the electrical actuating means for the raising and lowering means to cease motion, electrical means for retaining the display cards in raised position, means for breaking the circuit to the last mentioned means, electrical means for driving the cards to lowered position, electrical locking means for the selecting mechanism, and a trip mechanism engageable by the cards upon their downward movement for releasing said locking mechanism, substantially as and for the purposes set forth.

5. A machine of the character described, comprising in combination with the plurality of display cards, means for movably supporting the same, selective means for engaging certain of said cards at times, automatic means for raising and lowering said cards, means for automatically locking the selected cards in proper positions, other means engageable by the cards when in one position in their path of movement for causing said automatic means to become inoperative, and means actuated by the cards with their movement to another position for rendering the selected mechanism locking means neutral.

6. A machine of the character described, comprising a housing having a display window therein, a plurality of cards movably supported therein, means engageable with said cards for raising and lowering the same, selective means engageable with said cards for effecting their movement into engagement with said raising and lowering means whereby to permit the same to be arranged in displaying position before said window, electrical means for operating said raising and lowering means, other means for rendering the electrical means neutral, at times, still other electrical means for retaining the display cards in their raised positions, means for breaking the electrical circuit of the last-mentioned means whereby to permit the selected cards to automatically return to their normal positions, locking means for said selecting mechanism, and trip mechanism adapted to be engaged by a selected card upon its downward movement for releasing said locking mechanism.

In witness whereof I have hereunto set my hand.

SOLOMON ELIAS DUVECK.